Oct. 26, 1948.        P. A. BEZZERIDES        2,452,287
              HOT CAP SETTING MACHINE
Filed April 24, 1945                    2 Sheets-Sheet 2
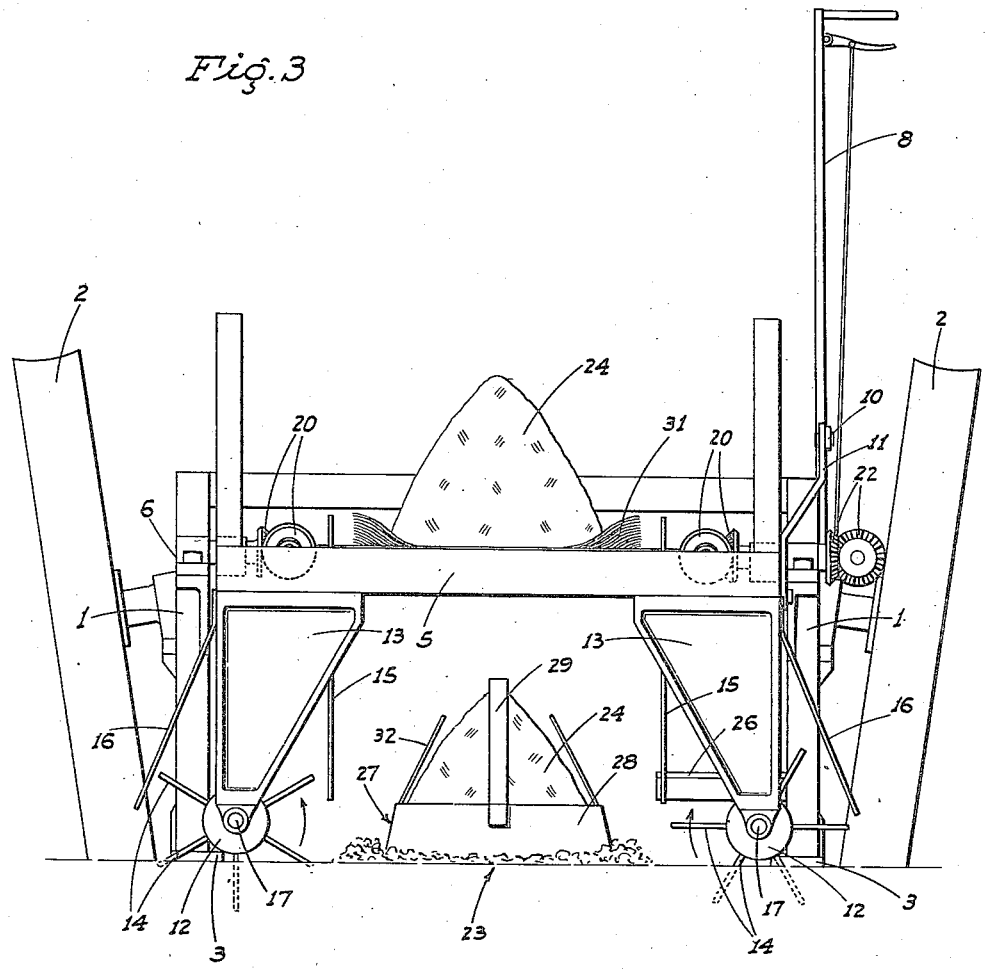
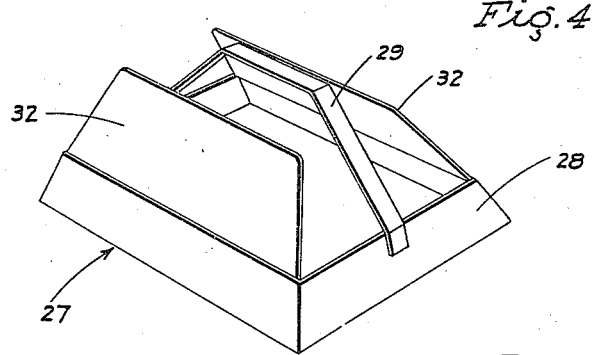
INVENTOR
Paul A. Bezzerides
BY
ATTORNEYS Patented Oct. 26, 1948

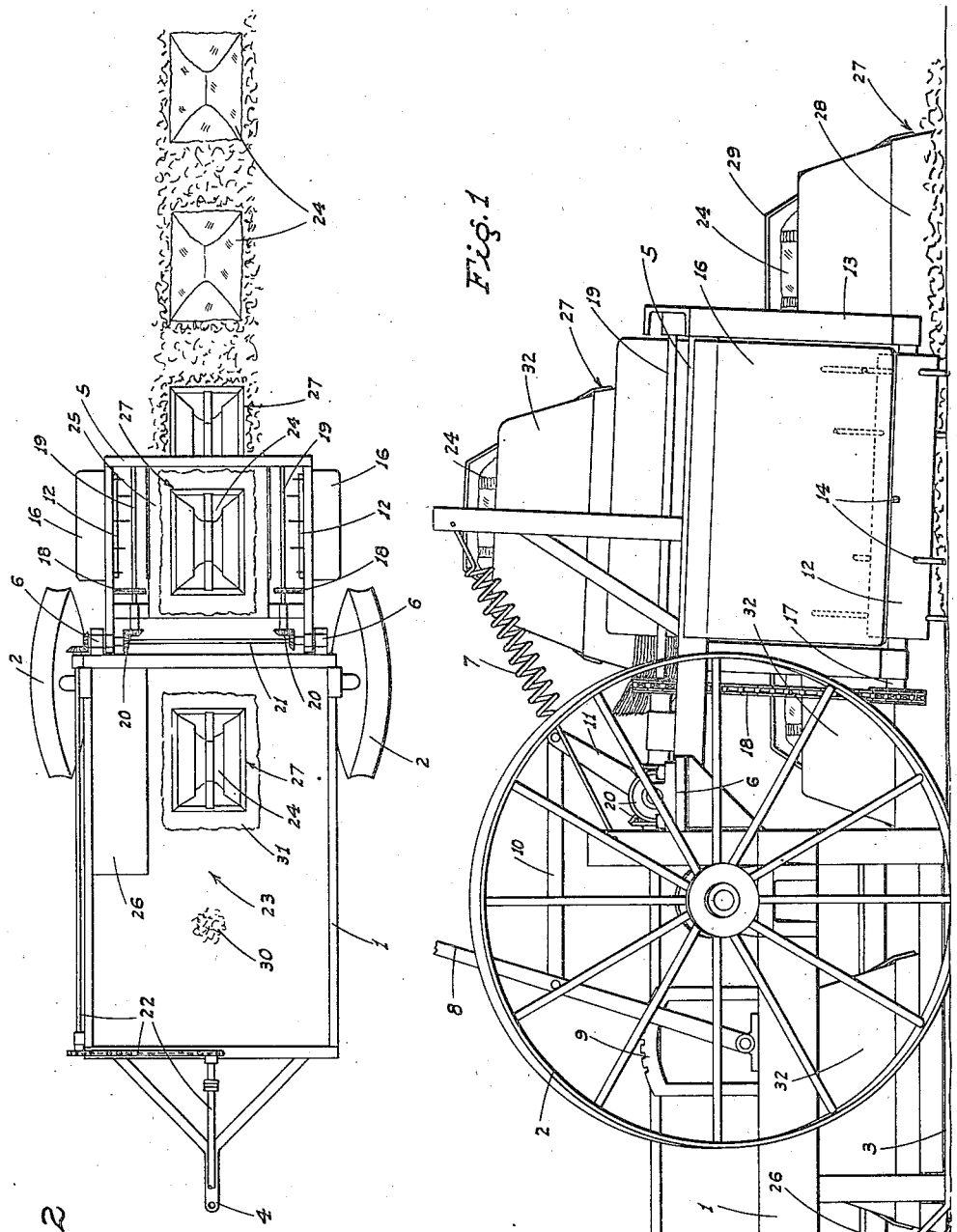

2,452,287

UNITED STATES PATENT OFFICE 2,452,287

HOT CAP SETTING MACHINE

Paul A. Bezzerides, Orosi, Calif.

Application April 24, 1945, Serial No. 590,018

4 Claims. (Cl. 47—1)

This invention relates in general to an improved agricultural implement.

In particular the invention is directed to, and it is an object to provide, a setting machine for hot caps or hot tents such as are used to enclose young plants, of row crops, to protect the same.

Another object of the invention is to provide a hot cap setting machine which is arranged, with movement along a row crop, to facilitate manual placement of the separate hot caps over individual plants in the rows, and to thereafter automatically cover the hold-down flanges of the hot caps with soil whereby to anchor said caps in place.

A further object of this invention is to provide a machine, as in the preceding paragraph, in which the means employed to cover the hold-down flanges of the caps with soil comprises a pair of transversely spaced, power driven soil throwing rotors; said rotors being driven in opposite directions and so as to throw soil laterally inwardly from opposite sides of the row onto said hold-down flanges of the then in place caps.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the machine in use.

Figure 2 is a top plan of the same.

Figure 3 is a rear end view.

Figure 4 is a perspective view of one of the hot cap setters used with the machine.

Referring now more particularly to the characters of reference on the drawings, the numeral 1 indicates the main frame which is open, and rectangular in plan; said main frame being supported, adjacent its rear end and on opposite sides, by inwardly canted rear wheels 2 together with ground engaging, stabilizing skids 3. A hitch 4, adapted for connection to a tractor, projects from the forward end of the main frame.

A trailing frame 5 is pivotally secured at its forward end, for vertical swinging movement, in connection with attachment brackets 6 at the rear of the main frame 1. Counterbalancing springs 7 connect between upstanding posts on the main and trailing frames, while the vertical position of the latter is controlled by a hand lever 8 normally but adjustably latched to a quadrant 9; the lever 8 being pivotally connected to a link 10 which in turn is pivoted to an upstanding lever 11 fixed to the trailing frame and projecting from substantially the axis thereof.

A pair of substantially horizontal, longitudinally extending soil throwing rotors 12 are rotatably suspended, in transversely spaced relation, beneath the trailing frame 5 by means of depending end brackets 13. The rotors 12 are parallel to each other and are rotated in opposite directions, turning inwardly and upwardly from the bottom as shown by the arrows in Figure 3; such rotors being driven as will later appear. The rotors 12 include a plurality of outwardly projecting soil engaging fingers 14 of substantial length.

Inner and outer protective shields 15 and 16 depend along corresponding sides of each rotor and terminate short of the ground; the inner shields 15 serving to prevent the dirt being thrown higher than necessary by the rotors, while the outer shields protect the operators from said rotors.

The rotors are driven by means of the following arrangement:

Each rotor includes a forwardly projecting stub shaft 17 driven by an endless chain and sprocket unit 18 from a counter-shaft 19 on the trailing frame 5; said counter-shaft 19 extending longitudinally forward to connection by bevel gears 20 with a cross shaft 21 journaled concentric to the pivotal axis of said trailing frame, whereby the latter can be vertically adjusted without interfering with the rotor drive means. The cross shaft is driven from the tractor power take-off shaft by a bevel gear and shafting assembly, indicated generally at 22, on the main frame 1.

When the machine is in operation, it is advanced, by the tractor, along a crop row 23 with the rotors on opposite sides thereof; the trailing frame being adjusted so that the rotor fingers 14 dig into the ground alongside said row.

A stack of hot caps 24 is disposed on a horizontal bed 25 on the trailing frame, and one operator stands on a platform 26 suspended from the main frame to one side of center, and adjacent the rear end thereof. A plurality of metallic setters 27, each of which includes a rectangular frame 28 closely conforming in shape vertically to the caps 24, and a bail 29 connected between the ends of the frame 28, are employed in the cap setting operation as follows:

The setters are disposed, one at a time, on the stack of caps 24 on bed 25, and the operator standing on platform 26 grasps each setter by the bail 29 together with the adjacent top portion of the engaged cap 24 in the stack. Then such bail and engaged cap 24 are lifted by hand and deposited over a plant 30 in the row 23 along which the machine is moving; the caps 24 having outwardly projecting flanges 31 at their lower edges, which flanges extend outwardly beyond the frame 28 of the setter. A hot cap and setter is thus placed over each plant 30.

With continued movement of the machine, the rotors move to position alongside the hot cap engaging setters; such rotors throwing a quantity of soil onto the exposed side and end flanges 31 so as to anchor the caps in place. Upstanding protector shields 32 on opposite sides of the setter frames 28 prevent flying pieces of soil from perforating the caps 24 which are of relatively light paper.

After the hot caps have been anchored in position as above, and when the machine has moved clear thereof, the setters 27 are lifted from the hot caps by one or more operators who then carry said setters forwardly preparatory to again placing the same, one at a time, on the stack of caps on the machine.

With the above described machine, hot caps can be placed on row crops rapidly and easily; the caps being effectively anchored against upsetting or loss by wind.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A machine for the purpose described comprising a wheel mounted vertically open frame, a draft element on the frame by which it may be drawn along the ground, a platform connected with the frame adjacent one end thereof and arranged to support a stack of hot caps having outwardly extending bottom flanges, an operator's station supported on the frame at a point closely adjacent the platform whereby an operator at such station may grasp and pass a hot cap from the platform to the ground below the open frame, and means supported from the frame and operable to deposit soil over the flange of the deposited hot cap as the frame is drawn along over and beyond the same.

2. A machine for the purpose described comprising a wheel mounted vertically open main frame, a draft element on the main frame by which it may be drawn along the ground, a trailing frame pivoted to the rear of the main frame for relative vertical swinging movement, means for adjusting the vertical position of the trailing frame relative to the main frame, a platform on the trailer frame arranged to support a stack of hot caps having outwardly extending bottom flanges, an operator's station supported on the main frame at a point closely adjacent the platform whereby an operator at such station may grasp and pass a hot cap from the platform to the ground below the frame, and means supported from the trailing frame and operable to deposit soil over the flange of the deposited hot cap as the trailer frame is drawn over the same.

3. A machine as in claim 2 in which the last named means comprises a pair of longitudinally extending soil engaging rotors suspended from the trailing frame in transversely spaced relation whereby to pass on opposite sides of the cap, driving gear mechanism mounted on the frames and connected with the rotors in driving relation therewith, such mechanism including means for connecting the same with a source of driving power.

4. A machine as in claim 3 including shields supported from the trailing frame and depending along opposite sides of each rotor and terminating adjacent but short of the ground.

PAUL A. BEZZERIDES.

REFERENCES CITED

The following references are of record in the file of this patent:

UNITED STATES PATENTS

| Number | Name | Date |
| --- | --- | --- |
| 328,330 | Melancon | Oct. 13, 1885 |
| 1,504,938 | Burnheimer | Aug. 12, 1924 |
| 1,887,387 | Wright | Nov. 8, 1932 |

FOREIGN PATENTS

| Number | Country | Date |
| --- | --- | --- |
| 842,380 | France | Mar. 6, 1939 |